(12) United States Patent
Lippert (10) Patent No.: US 6,526,435 B1
(45) Date of Patent: Feb. 25, 2003

(54) METHOD AND SYSTEM FOR DOWNLOADING SELECTED ROWS WITHIN A LISTING USING HYPERTEXT TRANSPORT PROTOCOL (HTTP)

(75) Inventor: Lisa Lippert, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/412,070

(22) Filed: Oct. 4, 1999

(51) Int. Cl.⁷ .............................................. G06F 15/16
(52) U.S. Cl. ............................ 709/203; 707/4; 707/10; 707/3; 707/5
(58) Field of Search .............................. 707/4, 5, 10, 3; 709/203, 225; 345/785, 786, 810

(56) References Cited

U.S. PATENT DOCUMENTS

| | | | | |
|---|---|---|---|---|
| 5,495,566 A | * | 2/1996 | Kwatinetz | 345/785 |
| 5,874,961 A | * | 2/1999 | Bates et al. | 345/786 |
| 5,898,434 A | * | 4/1999 | Small et al. | 345/810 |
| 6,208,986 B1 | * | 3/2001 | Schneck et al. | 709/225 |
| 6,233,574 B1 | * | 5/2001 | Ladwig et al. | 707/4 |

OTHER PUBLICATIONS

Whitehead, J. "Re: JW5: Paged Results," Aug. 1999, http://lists.w3.org/Archives/Public/www–webdav–dasl/1999JulSep/0019.html.*

Fielding, R., et al., "Hypertext Transfer Protocol—HTTP/1.1," RFC 2068, Jan. 1997, pp. 1–145.

Goland, Y., et al., "HTTP Extensions for Distributed Authoring—WEBDAV," RFC 2518, Feb. 1999, pp. 1–84.

"Extensible Markup Language (XML)—Part 1.Syntax," W3C, Mar. 1997, www.w3.org/TR/WD–xml–lang.html, pp. 1–47.

Babich, A., "Comments on Requirements," Jan. 1998, http://lists.w3.org/Archives/Public/www–webdav–dasl/1998Jan-Mar/0008.html, pp. 1–3.

Davis, J., "Re: Proposal for Paged Results," Sep. 1998, http://lists.w3.org/Archives/Public/www–webdav–dasl/1998JulSep/0102.html, pp. 1–2.

Davis, J., "Submission: draft–davis–dasl–requirements–00.txt," Sep. 1998, http://lists.w3.org/Archives/Public/www–webdav–dasl/1998JulSep/0114.html, pp. 1–10.

Lowry, D., "Proposal for Paged Search Results," Jul. 1998, http://lists.w3.org/Archives/Public/www–webdav–dasl/1998JulSep/0086.html, pp. 1–4.

Reddy, S., "Re: Proposal for Paged Results," Sep. 1998, http://lists.w3.org/Archives/Public/www–webdav–dasl/1998JulSep/0110.html, pp. 1–2.

Reddy, S., "Proposal for Paged Results," Sep. 1998, www.w3.org/Archives/Public/www–webdav–dasl/1998JulSep/0097.html, pp. 1–3.

* cited by examiner

Primary Examiner—Zarni Maung
Assistant Examiner—Gregory Clinton
(74) Attorney, Agent, or Firm—Workman, Nydegger & Seeley (57) ABSTRACT

A method is described in which a client computer generates an HTTP request and transmits the request to a server computer that has access to a listing such as an e-mail listing, a directory listing, or a table. The HTTP request includes an identification of a number of row ranges within the listing. The server computer responds by transmitting an HTTP response that includes the number of row ranges back to the client computer. Since the entire listing need not be downloaded, and since a separate HTTP request is not required for each row range, time is conserved. In another method, the request includes an identification of a reference row other than by the row's exact sequential position in the listing. The row range is identified with respect to the reference row. Since row numbers for each given row can often change in frequently edited listings, the present invention more accurately downloads the desired rows.

29 Claims, 6 Drawing Sheets

FIG. 2

| LAST NAME FIELD | FIRST NAME FIELD | OTHER INFORMATION FIELD | UID FIELD | ROW NUMBER |
|---|---|---|---|---|
| AADAN | AARON | 1 SYCAMORE BLVD. | 7C3A | 1 |
| AAMID | JOHN | 2 THORAX DRIVE | 943F | 2 |
| AAMAN | TRACY | 3 UNIVERSE PLAZA | EA77 | 3 |
| ⋮ | ⋮ | ⋮ | ⋮ | ⋮ |
| ZAABRAY | THERESA | 9907 MONROE STREET | 320A | 9907 |
| ZAAL | TYRONE | 9908 THOMPSON WAY | BC71 | 9908 |
| ⋮ | ⋮ | ⋮ | ⋮ | ⋮ |
| ZEDEKIAH | NATHAN | 9926 MOUNTAIN VIEW | 39FF | 9926 |
| ⋮ | ⋮ | ⋮ | ⋮ | ⋮ |
| ZYLA | MARY | 9999 TOPAZ LANE | C7B8 | 9999 |
| ZYNDA | ZELDA | 10,000 VISTA CIRCLE | 56DA | 10,000 |

┌──────────────────────────────────────────────────────────────┐
   │ REQUEST LINE 501                                             │
   │  ┌───────────────────┬──────────────────┬──────────────────┐ │
   │  │ METHOD TOKEN 502  │ REQUEST URI 503  │ PROTOCOL VERSION 504│
   │  └───────────────────┴──────────────────┴──────────────────┘ │
   └──────────────────────────────────────────────────────────────┘

┌───────────────────────────┐
   │ HEADERS 505               │
   │  ┌──────────────────────┐ │
   │  │ ROW RANGE HEADER 506 │ │
   │  └──────────────────────┘ │
   │  ┌──────────────────────┐ │
   │  │ OTHER HEADERS 507    │ │
   │  └──────────────────────┘ │
   └───────────────────────────┘

┌───────────────────┐
   │ MESSAGE BODY 508  │
   └───────────────────┘
```

┌──────────────────────────────────────────────────────────────┐
   │ STATUS LINE 601                                              │
   │  ┌───────────────────┬──────────────────┬──────────────────┐ │
   │  │ PROTOCOL VERSION 602 │ STATUS-CODE 603 │ REASON-PHRASE 604│
   │  └───────────────────┴──────────────────┴──────────────────┘ │
   └──────────────────────────────────────────────────────────────┘

┌───────────────────────────┐
   │ HEADERS 605               │
   │  ┌──────────────────────┐ │
   │  │ ROW RANGE HEADER 606 │ │
   │  └──────────────────────┘ │
   │  ┌──────────────────────┐ │
   │  │ OTHER HEADERS 607    │ │
   │  └──────────────────────┘ │
   └───────────────────────────┘

┌─────────────────────────────────┐
   │ MESSAGE BODY 608                │
   │  ┌────────────────────────────┐ │
   │  │ ROW RANGES 609             │ │
   │  │  ┌───────────────────────┐ │ │
   │  │  │ FIRST ROW RANGE 610   │ │ │
   │  │  └───────────────────────┘ │ │
   │  │  ┌───────────────────────┐ │ │
   │  │  │ SECOND ROW RANGE 611  │ │ │
   │  │  └───────────────────────┘ │ │
   │  │  ┌───────────────────────┐ │ │
   │  │  │ OTHER ROW RANGE 612   │ │ │
   │  │  └───────────────────────┘ │ │
   │  └────────────────────────────┘ │
   └─────────────────────────────────┘
```

FIG. 6

| | | |
|---|---|---|
| ZAABRAY | THERESA | 9907 MONROE STREET |
| ZAAL | TYRONE | 9908 THOMPSON WAY |
| ZAAM | ABBEY | 9909 THOMPSON WAY |
| ZAAN | BOB | 9910 " " |
| ZAAP | CRAIG | 9911 " " |
| ZABA | DAN | ... |
| ZABB | EMILY | ... |
| ZABERY | FENWICK | ... |
| ZACH | GAIL | ... |
| ZACH | TRACEY | ... |
| ZACH | YVONNE | ... |
| ZACHERY | THOMAS | ... |
| ZANE | RICKEY | ... |
| ZANEY | JUNE | ... |
| ZANEY | THOMAS | ... |
| ZAP | ZIGGY | ... |
| ZE | WAN | ... |
| ZEA | BARBARA | ... |
| ZEDEKIAH | ABE | ... |
| ZEDEKIAH | NATHAN | 9926 MOUNTAIN VIEW |

← REFERENCE ROW

FIG. 7

METHOD AND SYSTEM FOR DOWNLOADING SELECTED ROWS WITHIN A LISTING USING HYPERTEXT TRANSPORT PROTOCOL (HTTP)

BACKGROUND OF THE INVENTION

1. The Field of the Invention

The present invention relates to electrical computers and data processing systems. Specifically, the present invention relates to a system and method for downloading selected rows within a listing using HyperText Transport Protocol (HTTP).

2. The Prior State of the Art

The Internet has revolutionized the way people communicate and learn. With just a computer, a Web browser, and an Internet connection, a user can access a host of services available on the Internet.

In a typical method of accessing the Internet, the user will first indicate a desire to access the Internet through a graphical user interface provided by the Web browser. For example, the user might use a pointing device such as a mouse to click a "SIGN ON" button displayed by the Web browser on the computer display. The user's computer (i.e., the client computer) then links to the Internet automatically. The user might then download a resource such as a Web page, a directory listing, an e-mail listing, or a table by the user requesting that information. For example, the user might click on a hypertext link in a HTML document to request the resource corresponding to that hypertext link. In response, the client computer and server computers on the Internet automatically download the requested resource to the client computer. Since the actions undertaken by the client computer and server computers to satisfy this request are largely hidden from the user, accessing the Internet can be quite easy for a user once the user becomes familiar with their computer and Web browser.

What is less apparent is what actions are undertaken by the client computer and server computers on the Internet in order to respond appropriately to the user's request for information. In response to the user's request, the client computer generates an electronic request for the corresponding resource. This request is typically then transmitted to a server computer that has access to the requested resource. Once the server computer receives the electronic request, the server computer interprets the request, and responds by sending an electronic response including the desired resource to the client computer.

In order for this communication to work properly, there must be a standard for communicating between the client computer and the server computer that has access to the desired resource. One of the most pervasive standard used in sending and receiving messages over the Internet is called HyperText Transport Protocol or "HTTP". Electronic requests can include one of several methods defined by HTTP, the methods defining the action to be taken upon a desired resource. For example, a "GET" method causes the server computer to download the resource in its entirety to the client computer.

While HTTP is normally used to retrieve documents over the Internet, an extension of HTTP called Distributed Authoring and Versioning (or "WEBDAV") defines standards for retrieving a listing of elements whether it be a directory listing, an e-mail listing, a listing of rows in a table, or some other kind of listing. Often, these listings can be quite large. Rather than downloading these listings in their entirety, WEBDAV allows a client computer to request only those rows within a certain range. The server computer responds by downloading only the identified row range rather than the entire listing.

The row range is identified in the request using row numbers. For example, the HTTP request might specify that only the row range from row 1400 through row 1420 of the listing is desired. Therefore, even if the listing is relatively large, only a small portion of the listing is downloaded. Thus, the requested rows are downloaded and viewed relatively quickly. This allows the user to access desired rows without the inconvenience of having to wait for the entire listing to be downloaded.

Although this method has its advantages, it still has several disadvantages. For example, this method permits only one row range to be downloaded at a time. Suppose that the listing was a listing including the names of individuals in alphabetical order. Now suppose the user needs information regarding Aaron Aadan and Zelda Zynda. In the above describe row range method, the user would need to issue a request for Aaron Aadan perhaps designating early rows in the listing such as rows 1–20. The user would then need to issue a separate request for Zelda Zynda by perhaps designating latter rows in the listing such as rows 9981–10000 (assuming a listing 10000 rows long). If information regarding more individuals were desired, even more requests would need to be issued. Each request takes additional effort of the user, time for the server to process the request, and time for the server to download the request. If the server is busy processing other requests, this additional request might wait in a buffer until the server computer can process the request which can take even more time. In addition, if the network is experiencing a lot of traffic, the download time may also be high, thus increasing the time required to obtain the desired information even further.

Another disadvantage of this method is based on the fact that the row range is specified by row numbers. If the row numbers change frequently the row range may not correspond to the intended range. For example, suppose that the user requests rows 980–1000 of the listing and receives rows 980–1000. While the user is analyzing these rows, 5 new rows are inserted before row 980. Now, unbeknownst to the user, rows 980–1000 are reassigned by the server as rows 985–1005 to accommodate the insertion.

Now, suppose that the user desires to see the next 20 rows in the listing. The user would logically request rows 1001–1020 thinking that the user would receive the next 20 rows with no overlap. However, the user would actually receive five rows of overlapping rows corresponding to the current rows 1001–1005 which correspond to the rows 996–1000 previously downloaded. Thus, in the second download, the user did not receive the intended row ranges, and the user undesirably does not have complete control over which rows are downloaded. Therefore, what is desired is a system and method for more flexibly and accurately downloading row ranges using a single request.

SUMMARY OF THE INVENTION

The present invention may be implemented in a computer network such as the Internet that includes client computers that generate requests for services, and include server computers that fulfill such requests.

In one method of the present invention, one of the client computers accesses a listing having a number of rows. For example, this listing might be a directory listing, an e-mail listing, a contacts listing, a table listing, or any other type of listing accessible by one of the server computers in the computer network. The client computer does not access all of the listing since downloading the entire listing could be time consuming. Instead, the client computer accesses only the information within row of certain row ranges.

The client computer first generates a single HTTP request for the rows within the desired row ranges. Since this request is compliant with HTTP protocol as an extension of HTTP, a common Internet protocol, the present invention allows for the retrieval of row ranges over the Internet. This is especially advantageous in the context of the Internet since the Internet permits numerous client computers to communicate with numerous server computers. Thus, each client computers has access to numerous listings through numerous server computers. The present invention also allows client computers to access these listings without having to download the entire listing. Since many client computers have connections to the Internet that download data very slowly, allowing for the flexible downloading of only a portion of the listing saves significant time.

The client computer then transmits the HTTP request over the computer network to be received by the server computer that has access to the listing. In response to the HTTP request, the server system accesses the listing to retrieve the rows within the requested row ranges. Then, the server computer generates an HTTP response that includes the row ranges, and transmits the HTTP response over the computer network for receipt by the client computer.

The present invention allows for rows within several row ranges to be downloaded in response to a single request. Previously, a separate HTTP request was required for each row range. Since each separate HTTP request would needed to be routed through the computer network to the server computer where it may wait for processing a significant amount of time if the server computer is overloaded, each separate request could take some time to be fulfilled. Reducing to one the number of requests required thus increases the speed with which the several row ranges can be downloaded.

In another method in accordance with the present invention, the client computer generates an HTTP request for rows within a row range. The request includes an identification of a reference row in the listing other than by the reference row's precise sequential position within the listing. For example, instead of identifying the reference row by a row number, the reference row is identified perhaps by its content, and/or by a unique identifier that is permanently assigned to the desired row. The row range is identified relative to the reference row. For example, the row range may be defined as the 20 rows beginning with the reference row. The client computer then transmits the HTTP request to the server computer. Once the server computer receives the HTTP request, the server computer accesses the listing, retrieves the identified row range, generates an HTTP response including the row range, and transmits the HTTP response to the client computer.

Since the row range is identified relative to the reference row, and since the reference row is identified independently of its precise sequential position in the listing, row numbers corresponding to a row range may be altered without changing the resulting downloaded row ranges. For example, suppose the client computer previously downloaded 20 rows ending with a row containing a LastName field of "Zedekiah", a first name field of "Nathan", and a unique identifier field of "39FF" in hexadecimal. Now suppose the user presses the "page down" button on her keyboard. The client computer would respond by requesting from the server computer 20 rows beginning with the row containing "Nathan Zedekiah" and having the unique identifier "39FF". If the client computer were to identify the reference row by row number, there may be some skipped rows or overlapping rows if rows were deleted or inserted to the listing at the server computer just prior to the page down operation at the client computer.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

In accordance with the present invention, a flexible system and method are described for downloading only those rows within selected row ranges of a listing using the HyperText Transport Protocol (HTTP) without having to download the entire listing.

For example, a client system might download more than just one selected row range of the listing using a single HTTP request. Thus, a client system might access, for example, a row range from row 1 through row 20 and a second row range from row 9981 through row 10,000 using a single HTTP request, thereby eliminating the need for multiple HTTP requests.

Also, a client system might download a selected row range by generating an HTTP request that identifies the row range by other that the precise sequential position of the row range within the listing. For example, instead of identifying the row range from row 9981 through row 10,000 in a listing of 10,000 rows, the request might indicate that the first 20 rows in an alphabetical listing having entries beginning with "Z" in a last name field are desired. The request might also indicate that 20 rows should be downloaded starting with approximately 50% down the listing. Thus, the row range identified is independent of its row number. Accordingly, row numbers corresponding to a row range may be altered at the server system without affecting the rows later downloaded to the client system.

Figure 1:
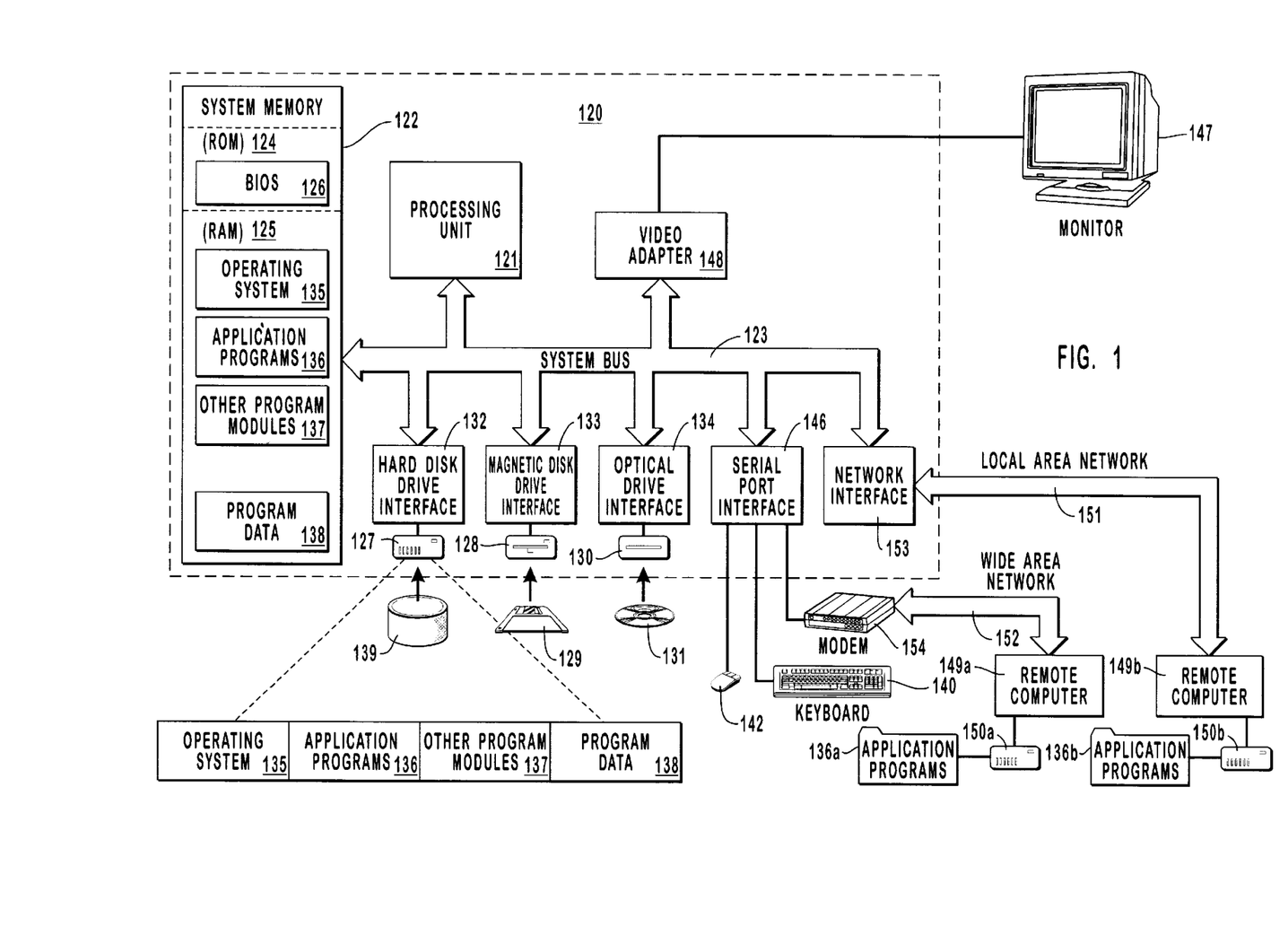
FIG. 1 schematically illustrates a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding specific acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 120, including a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149*a* and 149*b*. Remote computers 149*a* and 149*b* may each be another personal computer, a server, a router, a network PC, a peer device or other common network node, and typically includes many or all of the elements described above relative to the computer 120, although only memory storage devices 150*a* and 150*b* and their associated application programs 136*a* and 136*b* have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

Figure 2:
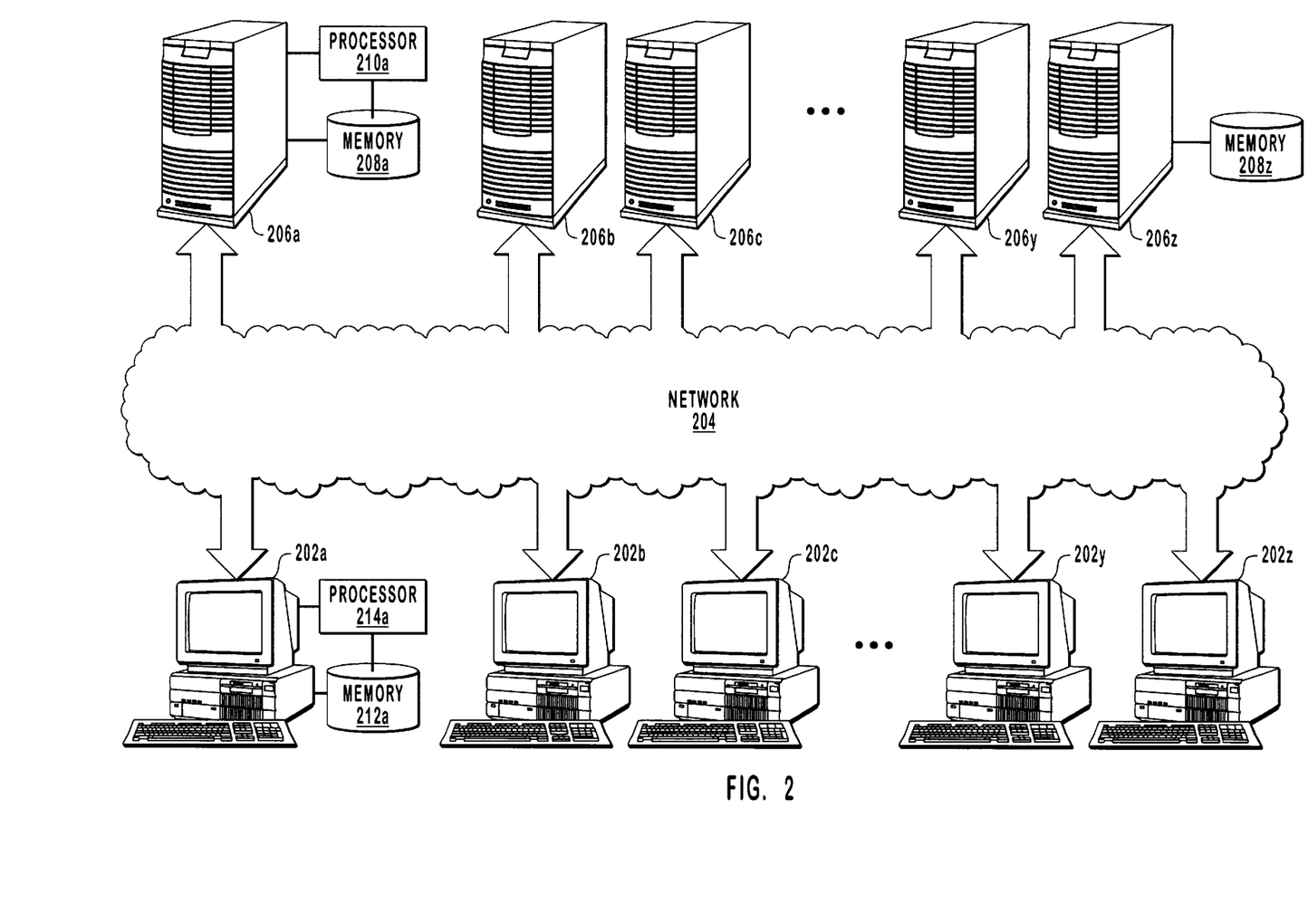
FIG. 2 schematically illustrates a suitable client-server network environment for the present invention.

FIG. 2 illustrates a client-server network 200 in which the present invention may operate. The client-server network 200 includes a number of client systems 202 including client system 202*a* through client system 202*z*. For clarity, only client systems 202*a*, 202*b*, 202*c*, 202*y* and 202*z* are shown in FIG. 2. At least one of the client systems, namely client system 202a, is structured in any desired manner to accomplish the steps and specific acts described below with reference to the flowchart of FIG. 4. The client system 202a includes, among other components, a memory 212a capable of storing instructions for performing the steps and specific acts described herein. The client system 202a also includes a processor 214a capable of executing those stored instructions. In one embodiment, the client system 202a is structured as described with reference to the computer 120 of FIG. 1.

The client systems 202 are each connected through a network 204 to a number of server systems 206 including server system 206a through server system 206z. For clarity, only server systems 206a, 206b, 206c, 206y and 206z are shown i FIG. 2. The network 204 may be any network capable of communicating messages using HyperText Transport Protocol (HTTP) or any extension thereof including Distributed Authoring and Versioning (DAV) such as a corporate Intranet or the Internet. In this description and in the claims, HTTP and all its extensions including DAV will be referred to as simply HTTP or HyperText Transport Protocol. If the client system 202a is structured similar to the computer 120 of FIG. 1, the network 204 may be structure similar to the LAN 151 or WAN 152 of FIG. 1.

At least one of the server systems 206, namely server system 206a, is structured in any desired manner to accomplish the steps and specific acts described below with reference to the flowchart of FIG. 4. The server system 206a includes, among other components, a memory 208a capable of storing instructions for performing the herein described steps and specific acts. In addition, the server system 206a includes a processor 210a capable of executing those stored instructions. The steps and specific acts described herein implemented by the client system 202a and the server system 206a may also be performed by hardware or by a combination of software and hardware. In one embodiment, the server system 206a is structured as described above for the remote computer 149a or 149b of FIG. 1. The other server systems also typically contain a memory as well. For example, server system 206z contains a memory 208z.

Figure 3:
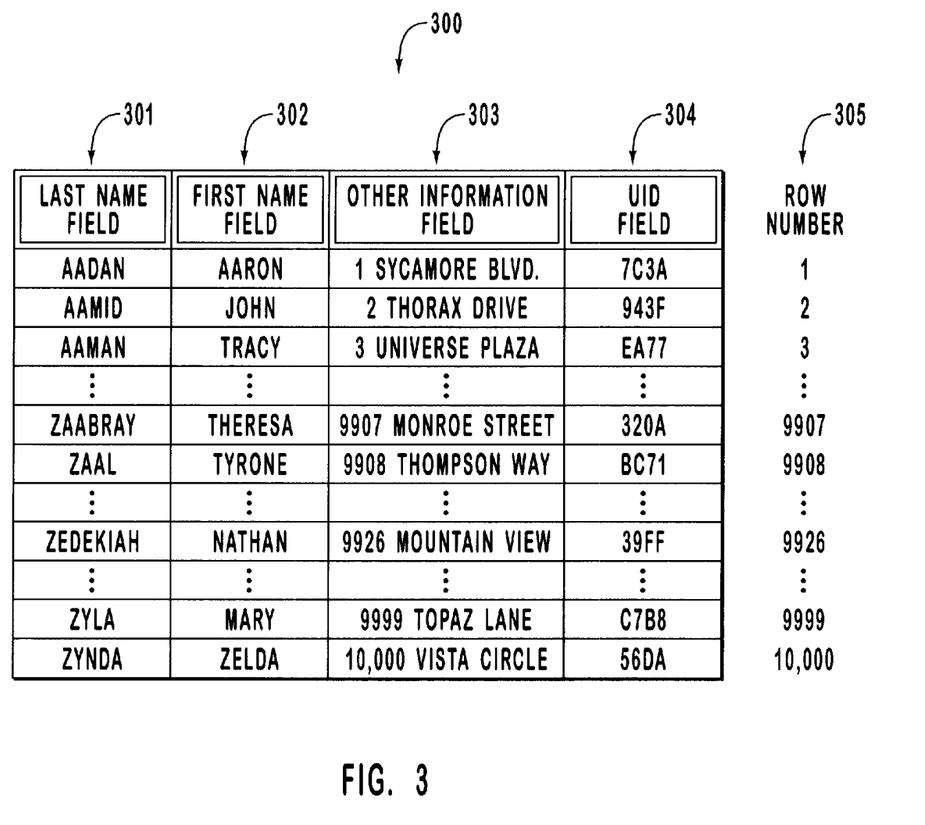
FIG. 3 schematically illustrates a data structure of a listing stored in a memory accessible by one of the server systems of FIG. 2.

FIG. 3 shows a data structure that represents a listing 300 to which the server system 206a has access. The client system 202a operates to direct a request to the server system 206a to download a certain row ranges of the listing 300 as described further below. The listing 300 includes a number of rows of information. As an example, the illustrated listing 300 includes 10,000 rows, of which, for clarity, only rows 1, 2, 3, 9907, 9908, 9926, 9999, and 10000 are shown. Each row contains information concerning a person. For example, each row contains a number of fields 301–303 including a last name field 301, a first name field 302, and an "other information" field 303. This other information field 303 may be comprises of one or more fields including information such as an address, a phone number, an account balance, a credit score, a password, or any other desired information related to the person.

The listing may be sorted in any manner or may be entirely unsorted. Optionally, each row may have a unique identifier field 304 that contains a unique identifier corresponding to the row. For purposes of discussion, row numbers 305 are also provided indicating the precise sequential position of the row in the listing 300. This listing is shown in FIG. 3 for purposes of discussion only, and is not limiting. The listing may include any number of rows having any number of fields describing any number of things.

Downloading the entire listing of 10,000 rows would be time consuming. For efficiency, the method of the present invention downloads only a portion of the listing. Specifically, in accordance with a first embodiment of the invention, a number of row ranges are downloaded from the server system 206a to the client system 202a using a single HTTP request. FIG. 4 illustrates a flowchart of such a method 400.

Figure 4:
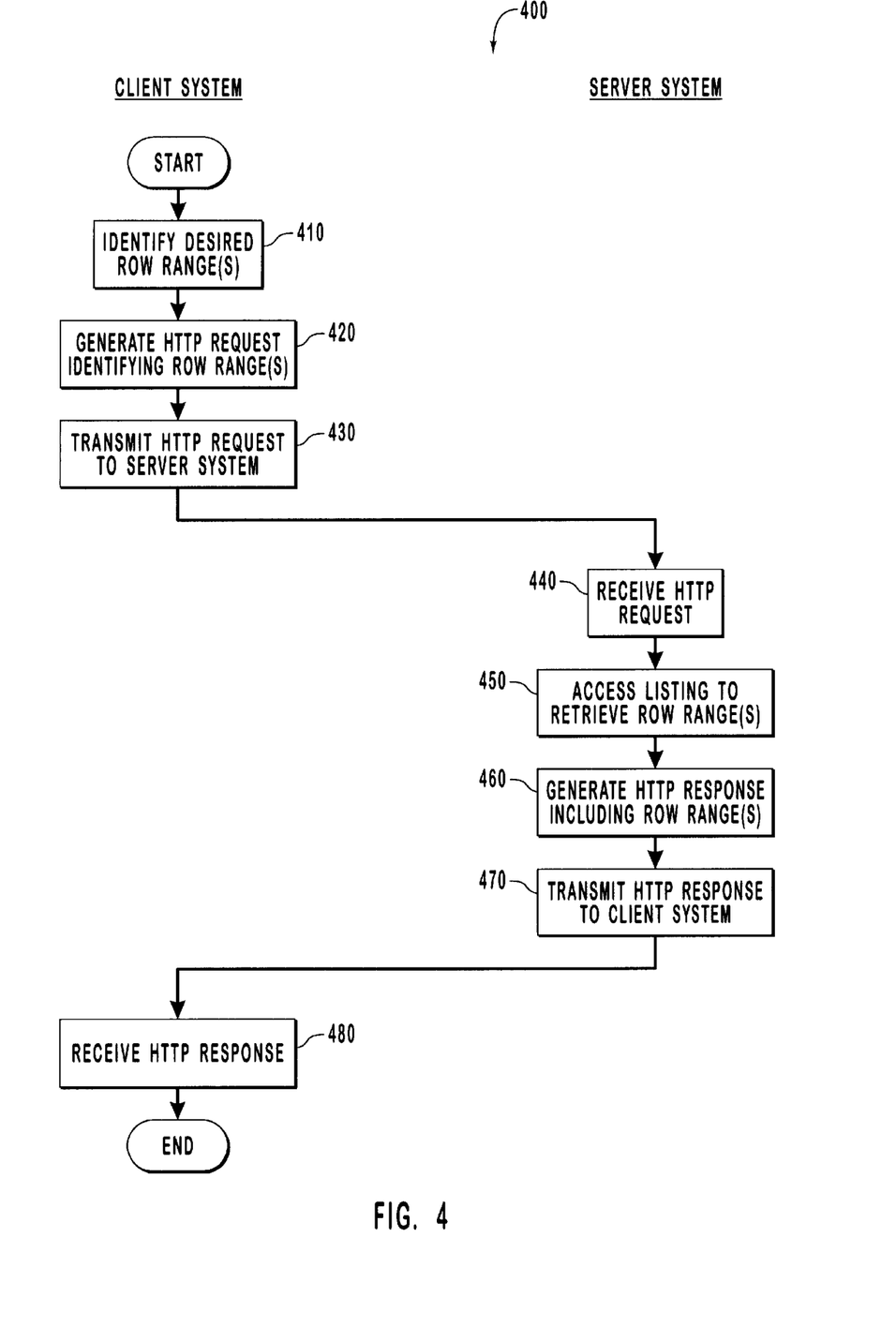
FIG. 4 illustrates a flowchart of communication between the client system and the server system used to download a row range or multiple row range in response to an HTTP request.

Referring to FIG. 4, blocks included in the left hand side of FIG. 4 underneath the heading "CLIENT SYSTEM" indicate steps or specific acts performed by the client system 202a. Block included under the heading "SERVER SYSTEM" in the right hand side of FIG. 4 indicate steps or specific acts performed by the server system 206a.

First, the client system 202a performs a step of identifying the desired multiple row ranges (step 410 of FIG. 4). The client system 202a may identify these multiple row ranges by evaluating user input and/or by evaluating settings in memory. For example, a user may expressly indicate that a first row range from row 1 to row 20 and a second row range from row 9981 to row 10,000 is desired, Also, a user may indicate certain facts from which the client system 202a can induce the identity of desired row ranges. For example, suppose the server system 206a stores an alphabetical listing of 10,000 individuals with associated information and that the user at the client system ultimately wants information concerning Nathan Zedekiah in row 9926. Suppose further that the client system 202a does not know the exact row number for the row corresponding to Nathan Zedekiah. The client system 202a might provide a systematic way for the user to find this entry as is now described.

Instead of trying to display all 10,000 rows of information, the client system 202a might display a smaller sampling of the rows positioned throughout the listing 300. For example, the client system 202a might initially display only the following 10 sample rows:

| Last Name | First Name | Row Number |
|---|---|---|
| Aadan, | Aaron | 1 |
| Bingham | Barney | 1001 |
| Davies | Donna | 2001 |
| Faust | Frederick | 3001 |
| Huang | Harry | 4001 |
| Lu | Laura | 5001 |
| Notting | Nancy | 6001 |
| Price | Peter | 7001 |
| Stockley | Sarah | 8001 |
| Thompson | Theresa | 9001 |

To obtain this list, the client system 202a might ask for 10 row ranges having a size of one. It is unlikely that the desired row would appear in this list. Thus, to further refine the search, the user might select "Thompson, Theresa" stored in row 9001. In response, the client system might retrieve and display the following rows which are closer to what the user is looking for:

| Last Name | First Name | Row Number |
|---|---|---|
| Thompson | Theresa | 9001 |
| Trand | Thomas | 9101 |
| Uhls | Ulipses | 9201 |
| Ural | Unites | 9301 |
| Vale | Veronica | 9401 |
| Wagstaff | Wally | 9501 |

-continued

| Last Name | First Name | Row Number |
|---|---|---|
| White | William | 9601 |
| Williams | Wallace | 9701 |
| Wurner | Werner | 9801 |
| Yvenne | Yvonne | 9901 |

The client system may obtain this listing by request nine additional separate row ranges having a size of one. These rows would include rows 9101, 9201, 9301, 9401, 9501, 9601, 9701, 9801 and 9901. Now the user might select "Yvenne Yvonne" because Zedekiah, Nathan would be listed just after "Yvenne Yvonne". In response, the client system 202a might retrieve and display all rows in the listing 300 within the 9900's range including the desired row 9926. In this manner, the client system 202a might identify row ranges based on input from the user and based on its own settings.

In addition, the client system 202a might identify the desired multiple row ranges without any user input at all based entirely on its own internal settings. Any other conceivable specific acts toward accomplishing the step for identifying the multiple row ranges will also suffice.

Figure 5:
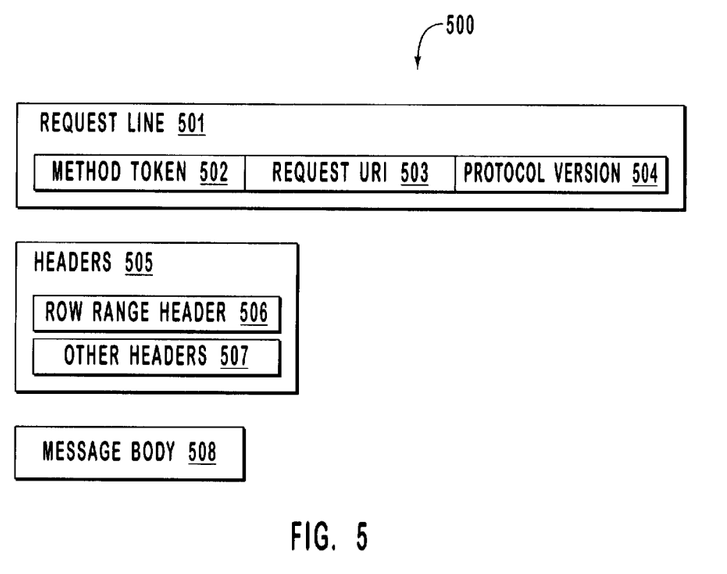
FIG. 5 schematically illustrates a data structure of the HTTP request referred to with respect to FIG. 4.

Once the client system 202a identifies the multiple desired row ranges, the client system 202a performs a step for generating an HTTP request that includes the identification of the row ranges (step 420 of FIG. 4). A schematic illustration of the data structure of an HTTP request 500 is shown in FIG. 5.

The first line of the HTTP request 500 is referred to in HTTP version 1.1 as a request line. This request line is illustrated in FIG. 5 as request line field 501 which includes a method token field 502 followed by a request Uniform Resource Identifier (URI) field 503 followed by a protocol version field 504. The following is an example of a request line for HTTP version 1.1:

PROPFIND /listing HTTP/1.1

The method token field 502 contains data representing case-sensitive characters (e.g., "PROPFIND" in the example request line) that indicate the method to be performed on the resource identified in the request URI field 503 (e.g., "/listing" in the example request line). Although "PROPFIND" is not one of the original methods supported by HTTP version 1.1, HTTP version 1.1 permits extension methods. Accordingly, the method "PROPFIND" is included as an extension method under the Distributed Authoring and Versioning protocol otherwise known as WEBDAV or simply DAV. The "PROPFIND" method instructs the server system to return requested property values associated with a resource. The method token field 502 might alternatively use another WEBDAV method called "SEARCH" which is similar to PROPFIND except that it returns only those values that satisfy the search parameters and may be sorted.

The request URI field 503 contains data representing the location (e.g., "/listing") of the resource upon which the method is to be applied. When the host name is not indicated in the request URI field 503, the other header field 507 in the headers field 505 would contain the host name to permit precise identification of the resource location. In this example, the resource "/listing" represents the location of the listing shown in FIG. 3.

The protocol identifier field 504 contains data representing the protocol type. In HTTP version 1.1 and in the example, the protocol type is "HTTP/1.1".

The HTTP request 500 also includes a headers field 505 that includes all header fields associated with the HTTP request 500 such a row range header field 506 that contains an identification of the desired row ranges as well as an other header field 507 that contains any other headers. The HTTP request 500 also may include a message body field 508.

The following is an example of a row range header that might indicate to the server system 206a that three row ranges from row 1 through row 20, from row 5001 through row 5020, and from row 9981 through row 10,000 are to be downloaded to the client system 202a.

Range: rows=1–20, 5001–5020, 9981–10000

Once the client system 202a generates the HTTP request 500, the client system 202a performs a specific act of transmitting the HTTP request 500 to the server system 206a (step 430 of FIG. 4). This transmission act may be performed using a dial-up modem, a direct network connection such as an Ethernet card, a satellite uplink, a cable, or by any other conceivable method. The only requirement is the transmission act transmit the HTTP request 500 to the server system 206a. It is not important to the invention how the HTTP request 500 is transmitted to the server system 206a.

The server system 206a then performs a specific act of receiving the HTTP request 206a (step 440 of FIG. 4). For example, the server system 206a might perform specific acts of receiving the HTTP request 206a using dial-up modem, a direct network connection such as an Ethernet card, a satellite downlink, or a cable. It is also not important how the server system 206a receives the HTTP request 500 so long as the HTTP request 500 is received.

The server system 206 interprets the HTTP request 500 as being a request to download the identified row ranges and responds by performing a step of accessing the listing 300 to retrieve the desired row ranges (step 450 of FIG. 4). For example, if the listing 300 were local to the server system 206a such as if the listing 200 is stored in the memory 208a local to the server system 206a, the server system 206a would simply access the listing 300 by accessing the memory 208a. The server system 206a would then retrieve the appropriate row ranges by submitting appropriate I/O requests through a driver to the memory 208a and reading the resulting row ranges from the memory 208a. In this case, the server system 206a would be termed an "origin server" as it is a server upon which the desired information resides.

However, there may be a case where the information does not reside on the server 206a. For example, although the HTTP request 500 is transmitted to the server system 206a, the listing 300 may actually reside within server system 206z in the memory 208z. In this case, the server system 206a acts as a proxy or gateway server and the server system 206z is the origin server. In this case, the server system 206a accesses the listing 300 to retrieve the row ranges by forwarding the HTTP request 500 to the server system 206z, or by generating its own request for the row ranges. This request might use HTTP or whatever protocol is recognized by the server system 206z, The request from the server system 206a may also be routed through several intermediate server systems en route to the server system 206z or may be transferred to the server system 206z through a direct link. In response, the server system 206z transmits the row ranges back to the server system 206a.

Figure 6:
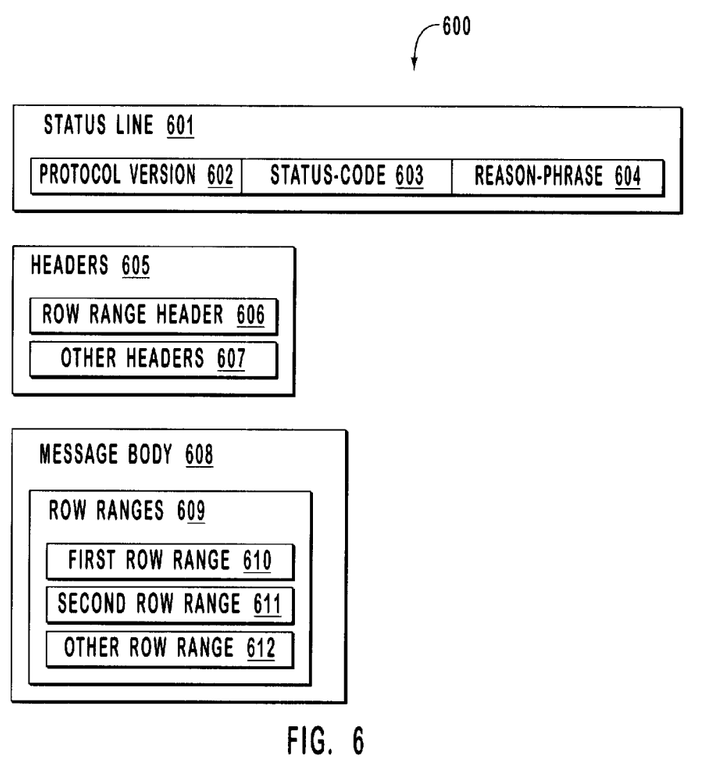
FIG. 6 schematically illustrates a data structure of the HTTP response referred to with respect to FIG. 4.

Once the server system 206a accesses the identified row ranges from the listing 300, the server system 206a then performs a step of generating an HTTP response that includes the identified row ranges (step 460 of FIG. 4). FIG. 6 schematically illustrates a data structure of such an HTTP response.

The first line of the HTTP response 600 is referred to in HTTP version 1.1 as a status line. The status line field 601 includes a protocol version field 602, a status-code field 603, and a reason-phrase field 604.

The protocol version field 602 contains the protocol version such as "HTTP/1.1" in the example.

The status-code field 603 contains a three-digit integer that represents the result of the attempt of the server system 206a to satisfy the HTTP request 500. In this example, the server system 206a successfully fulfills the request by including all of the requested row ranges in the response. A successful fulfillment of the request is marked in HTTP version 1.1 with a "200" status-code.

The reason-phrase field 604 includes a textual description of the meaning of the status-code. For example, an appropriate reason-phrase corresponding to the status code "200" may be "OK" indicating that the request is satisfied. HTTP version 1.1 allows for this reason-phrase to be altered as needed to convey this meaning. An example of a status line corresponding to the above-described example HTTP request would be as follows:

HTTP/1.1 200 OK

The HTTP response 600 also includes a headers field 605 which contains a row range header field 606 containing an identification of the row numbers being downloaded along with an indication of the total number of rows in the listing 300. The header field 605 also may include an other headers field 607 containing other headers.

The following is an example of a row range header indicating that rows 1–20, 5001–5020 and 9981–10,000 are being downloaded from a listing of 10,000 rows:

Content-Range: rows=1–20, 5001–5020, 9981–10000; total=10000

The HTTP response 600 also includes a message body field 608 which includes a row ranges field 609 that includes a first row range field 610 containing the first retrieved row range (e.g., from row 1 to row 20), a second row range field 611 containing the second retrieved row range (e.g., from row 5001 to row 5020), and optionally an other row range field 612 that would contain any other requested row ranges (e.g., the third row range field from row 9981–10000).

The following shows an example of an HTTP response downloading rows 1–20, 5001–5020 and 9981–10000.

HTTP/1.1 200 OK
Content-Range: rows=1–20, 5001–5020, 9981–10000; total=10000
<?xml version="1.0"?>
<?xml:namespace prefix="D" ns="DAV:"?>
<D:multistatus>
  <D:contentrange>1–20</D:contentrange>
  [ROWS 1–20]
  <D:contentrange>5001–5020<D/contentrange>
  [ROWS 5001–5020]
  <D:contentrange>9981–1000<D/contentrange>
  [ROWS 9981–10,000]
</D:multistatus>

As shown above, the message body (from "<?xml version="1.0"?>" downward) is in the form of an XML element. The rows in the square brackets "[" and "]" indicate that the actual rows of data indicated would be included in the brackets. For example, the characters "[ROWS 1–20]" actually symbolize the content of rows 1–20.

Once the server system 206a generates the HTTP response 600, the server system 206a performs a specific act of transmitting the HTTP response 600 (step 470) allowing the client system 202a to perform the specific act of receiving the HTTP response 600 (step 480). There are a variety of ways of for the server system 206a to transmit, and for the client system 202a to receive. The precise method for transmitting and receiving is not important to the present invention.

This completes the method for downloading multiple row ranges with a single HTTP request. Using this method, a user at the client system 202a has great flexibility on how many and which row ranges of the listing 300 are to be downloaded to the client system 202a. Furthermore, since only one HTTP request is required for this downloading, downloading occurs quickly A method in accordance with a second embodiment of the invention is illustrated also in the flowchart of FIG. 4. In this method, the server system 202a accesses a row range without specifying the exact location of the row range within the listing 300. In particular, the client system 202a does not specify the row numbers of the row range.

First, the client system 202a performs a step of identifying the desired row range (step 410 of FIG. 4). This identification would include an identification of a reference row without relying on the row number of the reference row. The row range would be identified based on this reference row.

Figure 7:
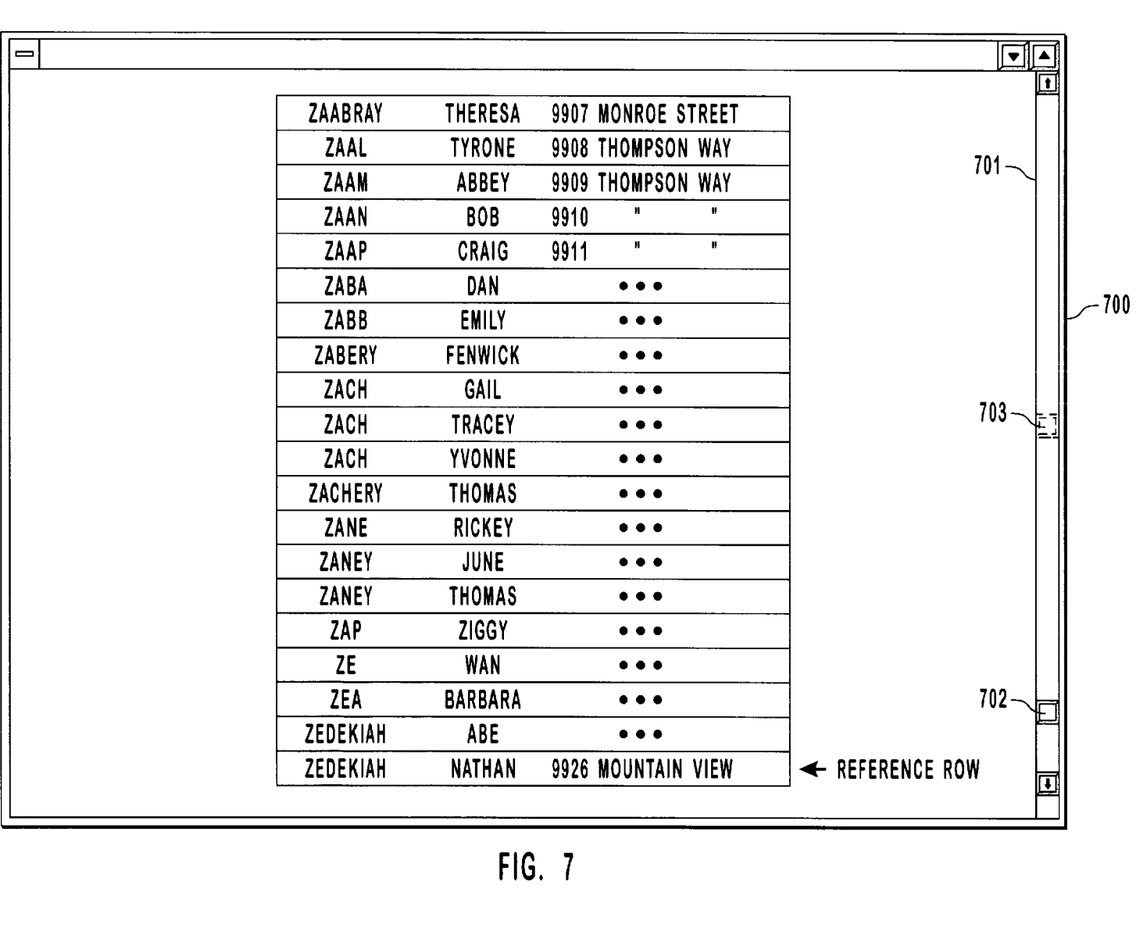
FIG. 7 illustrates a screen display as displayed on the client system of rows within a given row range of the listing of FIG. 3.

One example of this identification might occur during a page down. For example, suppose the client system 202a is capable of displaying 20 rows of the listing 300 at a time. Now suppose that the client system 202a is displaying 20 rows ending with the row that describes Nathan Zedekiah (row 9926 in the listing 300) which has a unique identifier of 39FF. FIG. 7 illustrates a display device 700 associated with the client system 202a that is currently displaying 20 rows ending with the row that describes Nathan Zedekiah. During a page down operation, the reference row would be identified as the row describing Nathan Zedekiah and as the row having the unique identifier 39FF. Note that the characters "reference row" are provided in FIG. 7 for clarity and would not actually be displayed. This example will herein be referred to as the "page down" example.

In response to a "page down" request from a user, the client system 202a will identify the desired row range relative to the reference row describing Nathan Zedekiah and having the unique identifier 39FF. For example, the client system 202a might identify the row range as being the 20 rows beginning with the reference row describing Nathan Zedekiah and having the unique identifier 39FF. When the requested row range is retrieved and displayed, it will appear as a page down with the last row of the previous screen being the first row of the new screen. The only overlapping row in both displays would be the reference row.

During a page up, the client system 202a might identify the desired row range as being the 20 rows ending with the first row now being displayed at the client system 202 thus simulating a page up operation. This first row would be considered to be the reference row and would be identified by its name "Theresa Zaabray" as in row 9907 of the listing 300. Thus, in a page up operation, the reference row would be the first row in the previous screen. This page up operation will herein be referred to as the "page up" example.

Note that these page up and page down operations may not be reliably simulated using the current method of identifying a row range by the row number. For example, suppose row 5001 through 5020 are currently being displayed. Now suppose that a page down operation is requested. The logical thing to do would be to request rows 5020–5039 allowing for one row of overlap of row 5020. This would work fine for a listing that does not change.

However, is some listings, rows are often inserted and deleted. Thus, the row numbers may be constantly in a state of flux. Suppose, for example, 5 rows are added to the beginning of the list since the time that row 5001 through row 5020 were added. This would result in the former row 5015 through 5034 being reassigned as the new rows 5020 through 5039. When the new rows are downloaded, the user would find that there are 6 rows of overlap with the prior screen. The same inaccuracies may be causes during a page up operation for similar reasons.

Another example of identifying the row range occurs in the context of resizing the window that is displaying rows. For example, suppose the client system 202a displays a window that contains only 10 rows from row 9907 through row 9916. Now suppose the user enlarges the window by dragging the upper border upwards so that 15 rows can now be displayed. In this case, the client system 202a would identify the row range as being the 5 rows prior to the first row in the last screen (e.g., the "Theresa Zaabray" row as in row 9907 of the listing 300). This example will herein be referred to as the "resize window" example.

Now suppose a portion of the listing 300 is being displayed with a scroll bar such as the scroll bar 701 in FIG. 7 indicating the approximate vertical position of the displayed. rows within the listing 300. Now the user drags the marker such as the marker 702 of FIG. 7 within the scroll bar 701 to a position that is half way between the top and the bottom of the scroll bar 701. This position is shown by the dotted lines 703 on the scroll bar 701. In response to this dragging operation, the client system 202a would approximate the desired row range as starting with a reference row approximately half way down the listing 300 and continuing therefrom for a predetermined length. This predetermined length might be limited to the number of rows the client system 202a is set to display, or may continue beyond the display capabilities of the client system 202a in which case the hidden rows may be stored in cache. This example will herein be referred to as the "scroll bar drag" example.

In addition, suppose the user indicates one or more characters such as "ZA". The client system 202 might interpret this as meaning that the reference row immediate after "ZA" alphabetically is to be the reference row starting the desired row range. This example will be herein referred to as the "starting characters" example.

The client system 202a may also identify the desired row range by considering row ranges that were freshly cached locally. The client system 202a may modify the identified row range by excluding rows already available in cache. For example, if the desired row range is rows 5001–5020, but rows 5000–5019 are already available locally in cache. The identified row range would be a row range including only row 5020. Caution should be used, however, in relying upon local cache to retrieve rows since the row numbers may frequently change in the listing 300.

Note that in all these row range identifications, the reference row is not identified by the rows exact position. For example, in page up, page down, and window resize operations, the reference row is identified according to more reliable and consistent properties such as the row's content such as "Nathan Zedekiah" and by its unique identifier such as 39FF. In the scroll bar drag example, the reference row is identified according to its approximate vertical position (e.g., 50%) within the listing 300. In the starting characters example, the reference row is identified according to the alphabetical proximity of the last name to the starting characters.

Once the client system. 202a identifies the desired row range, the client system 202a performs a step for generating an HTTP request for this row range (step 420 of FIG. 4). A schematic illustration of the data structure is also represented by the HTTP request 500 of FIG. 5. The only difference would be the exact content of the row range header field 506.

For example, recall that in the page down example, the reference row is identified as that containing the name "Nathan Zedekiah", and the row range is defined as the 20 rows beginning with the reference row. In this example, the following might represent a suitable row range header identifying this row range:

KeyRange: LastName="Zedekiah", FirstName="Nathan", rows=1 to 20

The characters "1–20" indicates that the row is the 20 rows beginning with the reference row. If the characters were "–18 to 1", that would indicate the 20 rows ending with the reference row. If the characters were "–19 to 0", that would indicate the 20 rows immediately preceding the reference row but not including the reference row. In other words, the integers following the "row=" characters would indicate the relative position of the starting row and ending row with respect to the reference row if the reference row was in position "1".

Recall that in the page up example, the reference row is identified as that containing the name "Theresa Zaabray", and the row range is defined as the 20 rows ending with the reference row. Accordingly, the following might represent a suitable row range header:

KeyRange: LastName="Zaabray", FirstName="Theresa", rows=–18 to 1

In the page resize window example, the reference row is identified as that containing the name "Theresa Zaabray", and the row range is defined as the 5 rows immediately prior to and not including the reference row. Accordingly, the following might represent a suitable row range header:

KeyRange: LastName="Zaabray", FirstName="Theresa", rows=–4 to 0

In the scroll bar drag example, the reference row is identified as having a position 50% down the listing 300. Note that the 50% does not represent a precise sequential position within the listing 300, just an approximate position within the listing 300. In this example, the row range is defined as the 20 rows following the reference row. Accordingly, the following might represent a suitable row range header:

Range: starting row=50%, rows=1 to 20

In the starting characters example, the reference row is identified as that row in which the content of the last name field is alphabetically immediately after the starting characters. Accordingly, the following might represent a suitable row range header:

KeyRange: LastName>="ZA", rows=1 to 20

After generating the HTTP request 400, the client system 202a transmits the request over the network 204 (step 430) after which the server system 206a that has access to the listing 300 receives the HTTP request 400 (step 440) as described above. Then, the server system 206a accesses the listing 300 to retrieve the identified row range (step 450).

The server system 206a then generates the HTTP response including the identified row range (step 460). The data structure for this HTTP response is also shown in FIG. 6 example that the first row range field 610 is the only necessary row range field within the message body 608. Likewise, the row range field 610 may represent the row range in XML format as described above.

The server system 206 then transmits the HTTP response 600 back to the client system (step 470) and the client system 480 receives the HTTP response 600 (step 480). This completes a method for accesses a row range without specifying the exact location of the row range within the listing 300.

The above describes a flexible system and method for downloading only those rows within selected row ranges of a listing using HTTP. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a computer network including a plurality of server systems connected through a network to a plurality of client systems, at least one of the server systems having access to a listing, a method of at least one of the client systems accessing a row range of the listing without having to download the entire listing and without having to specify the exact location of the row range within the listing, the method comprising the following:

a step for a client system generating a HyperText Transport Protocol (HTTP) request for the row range of the listing, the request including an identification of a reference row in the listing by using a property of one or more fields within the reference row rather than by using the reference row's precise sequential position in the listing, the request identifying the row range of the listing relative to the reference row;

a specific act of the client system transmitting a single HTTP request that includes an identification of the reference row along with an identification of the row range using the reference row over the network so as to be received by the server system that has access to the listing; and a specific act of the client system receiving an HTTP response over the network from the server that has access to the listing, wherein the response includes at least the row range of the listing.

2. The method according to claim 1, further comprising a step for the client system identifying the desired row range.

3. The method according to claim 2, wherein the step for the client system identifying the desired row range comprises the following:

a specific act of the client system receiving a page down instruction;

a specific act of the client system identifying the reference row as being the last row of the row range currently being displayed; and a specific act of the client system identifying the desired row range as beginning with the reference row.

4. The method according to claim 2, wherein the step for the client system identifying the desired row range comprises the following:

a specific act of the client system receiving a page up instruction;

a specific act of the client system identifying the reference row as being the first row the row range currently being displayed; and a specific act of the client system identifying the desired row range as ending with the reference row.

5. The method according to claim 2, wherein the step for the client system identifying the desired row range comprises the following:

a specific act of the client system receiving an instruction to move upwards the upper border of a window currently displaying another row range;

a specific act of the client system identifying the reference row as being the first row in the currently displayed row range; and a specific act of the client system identifying the desired row range as including a plurality of rows immediately preceding the reference row.

6. The method according to claim 2, wherein the step for the client system identifying the desired row range comprises the following:

a specific act of the client system receiving one or more characters entered by a user;

a specific act of the client system identifying the reference row as being the row alphabetically immediately after the received characters; and a specific act of the client system identifying the row range with respect to the reference row.

7. The method according to claim 2, wherein the step for the client system identifying the desired row range comprises the following:

a specific act of the client system receiving a scroll drag instruction;

a specific act of the client system identifying the reference row as being the row that is approximately in the same vertical position in the listing as a scroll marker is within the scroll bar; and a specific act of the client system identifying the row range with respect to the reference row.

8. In a computer network including a plurality of server systems connected through a network to a plurality of client systems, at least one of the server systems having access to a listing, a method of at least one of the client systems accessing a row range of the listing without having to download the entire listing and without having to specify the exact location of the row range within the listing, the method comprising the following:

a specific act of the client system identifying a reference row within the listing;

a specific act of the client system identifying the row range of the listing relative to the reference row, by using a property of one or more fields within the reference row rather than by using the reference row's precise sequential position in the listing;

a specific act of the client system generating a HyperText Transport Protocol (HTTP) request for the row range of the listing that includes the identification of the row range;

a specific act of the client system transmitting a single HTTP request that includes an identification of the reference row along with an identification of the row range using the reference row over the network so as to be received by the server system that has access to the listing; and a specific act of the client system receiving an HTTP response over the network from the server that has access to the listing, wherein the response includes at least the row range of the listing.

9. A method according to claim 8 further comprising a specific act of the client system receiving a page down instruction, the reference row being the last row of the row range currently being displayed, and the desired row range being identified as beginning with the reference row.

10. A method according to claim 8, further comprising a specific act of the client system receiving a page up instruction, the reference row being the first row of the row range currently being displayed, and the desired row range being identified as ending with the reference row.

11. A method according to claim 8, further comprising a specific act of receiving an instruction to move upwards the upper border of a window currently displaying another row range, the reference row of the row range currently being displayed, and the desired row range being identified as including a plurality of rows immediately preceding the reference row.

12. A method according to claim 8, further comprising a specific act of receiving one or more characters entered by a user, the reference row being the row alphabetically immediately after the received characters.

13. The method according to claim 8, further comprising a specific act of the client system receiving a scroll drag instruction, the reference row being the row that is approximately in the same vertical position in the listing as a scroll marker is within the scroll bar.

14. In a computer network including a plurality of server systems connected through a network to a plurality of client systems, at least one of the server systems having access to a listing, a computer program product for performing a method of at least one of the client systems accessing a row range of the listing without having to download the entire listing and without having to specie the exact location of the row range within the listing, the computer program product comprising the following:

a computer readable medium having computer executable instructions for performing the following:

a step for a client system generating a HyperText Transport Protocol (HTTP) request for the row range of the listing, the request including an identification of a reference row in the listing by using a property of one or more fields within the reference row rather than by the reference row's precise sequential position in the listing, the request identifying the row range of the listing relative to the reference row, a specific act of the client system transmitting a single HTTP request that includes an identification of the reference row along with an identification of the row range using the reference row over the network so as to be received by the server system that has access to the listing; and a specific act of the client system receiving an HTTP response over the network from the server that has access to the listing, wherein the response includes at least the row range of the listing.

15. A computer program product according to claim 14, wherein the computer readable medium further has computer-executable instructions for performing a step for the client system identifying the desired row range.

16. A computer program product according to claim 15, wherein the computer-executable instructions for performing the step for the client system identifying the desired row range comprise computer-executable instructions for performing the following:

a specific act of the client system receiving a page down instruction;

a specific act of the client system identifying the reference row as being the last row of the row range currently being displayed; and a specific act of the client system identifying the desired row range as beginning with the reference row.

17. A computer program product according to claim 15, wherein the computer-executable instructions for performing the step for the client system identifying the desired row range comprise computer-executable instructions for performing the following:

a specific act of the client system receiving a page up instruction;

a specific act of the client system identifying the reference row as being the first row the row range currently being displayed; and a specific act of the client system identifying the desired row range as ending with the reference row.

18. A computer program product according to claim 15, wherein the computer-executable instructions for performing the step for the client system identifying the desired row range comprise computer-executable instructions for performing the following:

a specific act of the client system receiving an instruction to move upwards the upper border of a window currently displaying another row range;

a specific act of the client system identifying the reference row as being the first row in the currently displayed row range; and a specific act of the client system identifying the desired row range as including a plurality of rows immediately preceding the reference row.

19. A computer program product according to claim 15, wherein the computer-executable instructions for performing the step for the client system identifying the desired row range comprise computer-executable instructions for performing the following:

a specific act of the client system receiving one or more characters entered by a user;

a specific act of the client system identifying the reference row as being the row alphabetically immediately after the received characters; and a specific act of the client system identifying the row range with respect to the reference row.

20. A computer program product according to claim 15, wherein the computer-executable instructions for performing the step for the client system identifying the desired row range comprise computer-executable instructions for performing the following:

a specific act of the client system receiving a scroll drag instruction;

a specific act of the client system identifying the reference row as being the row that is approximately in the same vertical position in the listing as a scroll marker is within the scroll bar; and a specific act of the client system identifying the row range with respect to the reference row.

21. In a computer network including a plurality of server systems connected through a network to a plurality of client systems, at least one of the server systems having access to a listing, a method of the server system downloading a row range of the listing in response to a HyperText Transport Protocol (HTTP) request from a client system notwithstanding that the HTTP request does not specify the exact location of the row range within the listing, the method comprising the following:

a specific act of the server system that has access to the listing receiving a single HTTP request from the client system, the single HTTP request including an identification of a reference row in the listing by using a property of one or more fields within the reference row rather than by using the reference row's precise sequential position in the listing, the request identifying the row range of the listing relative to the reference row;

a step for the server system accessing the listing to retrieve the row range of the listing;

a step for the server system generating an HTTP response corresponding to the single HTTP request, wherein the HTTP response includes the row range of the listing; and a specific act of the server system transmitting the HTTP response to the client system.

22. The method according to claim 21, wherein the step for the server system accessing the listing to retrieve the row range of the listing comprises the following:

a specific act of the server system locating the listing in a local memory; and a specific act of the server system retrieving the row range from the local memory.

23. The method according to claim 21, wherein the step for the server system accessing the listing to retrieve the row range of the listing comprises the following:

a specific act of the server system forwarding the single HTTP request to another server system on the computer network; and a specific act of the server system receiving the row range from the other server system over the computer network.

24. The method according to claim 21, wherein the step for the server system accessing the listing to retrieve the row range of the listing comprises the following:

a specific act of the server system generating another request for the row range identified in the single HTTP request from the client system;

a specific act of the server system transmitting the other request to another server system on the computer network; and a specific act of the server system receiving the row range from the other server system over the computer network.

25. A computer program product for performing the method recited in claim 21.

26. A computer program product for performing the method recited in claim 22.

27. A computer program product for performing the method recited in claim 23.

28. A computer program product for performing the method recited in claim 24.

29. A computer program product for performing the method recited in claim 8.

* * * * *

UNITED STATES PATENT AND TRADEMARK OFFICE
CERTIFICATE OF CORRECTION

PATENT NO. : 6,526,435 B1
DATED : February 25, 2003
INVENTOR(S) : Lisa Lippert

It is certified that error appears in the above-identified patent and that said Letters Patent is hereby corrected as shown below:

<u>Column 3,</u>
Line 34, after "HTTP request would" please delete "needed" and insert -- need --

<u>Column 4,</u>
Line 43, after "multiple row" please delete "range" and insert -- ranges --

<u>Column 7,</u>
Line 14, after "shown" please delete "i" and insert -- in --
Line 23, after "may be" please delete "structure" and insert -- structured --
Line 53, before "of one or more" please delete "comprises" and insert -- comprised --

<u>Column 10,</u>
Line 56, after "server system 206z" please delete "," and insert -- . --

<u>Column 13,</u>
Line 1, after "However," please delete "is" and insert -- in --
Line 9, after "may be" please delete "causes" and insert -- caused --
Line 23, after "position of the displayed" please delete "."
Line 67, after "Once the client system" please delete "."

<u>Column 14,</u>
Line 61, after "also shown in" please insert -- the --

<u>Column 15,</u>
Line 2, after "a method for" please delete "accesses" and insert -- accessing --
Line 61, after "the first row" please insert -- of --

UNITED STATES PATENT AND TRADEMARK OFFICE
CERTIFICATE OF CORRECTION

PATENT NO.    : 6,526,435 B1
DATED         : February 25, 2003
INVENTOR(S)   : Lisa Lippert It is certified that error appears in the above-identified patent and that said Letters Patent is hereby corrected as shown below:

<u>Column 17,</u>
Line 25, after "without having to" please delete "specie" and insert -- specify --
Line 38, after "the reference row" please delete "," and insert -- ; --

Signed and Sealed this

Third Day of February, 2004

JON W. DUDAS
*Acting Director of the United States Patent and Trademark Office*